Oct. 30, 1956  C. E. TACK  2,768,713
BRAKE HEAD BALANCING DEVICE
Filed Aug. 14, 1951  2 Sheets-Sheet 1
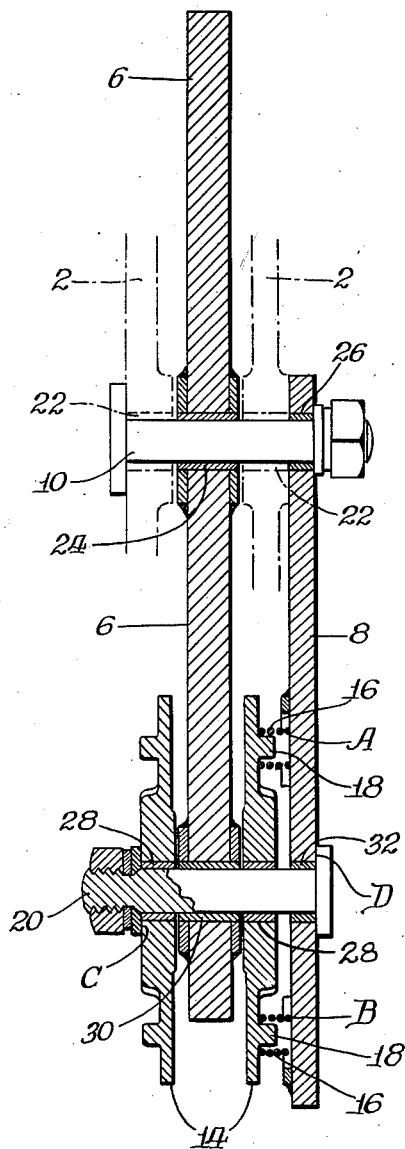
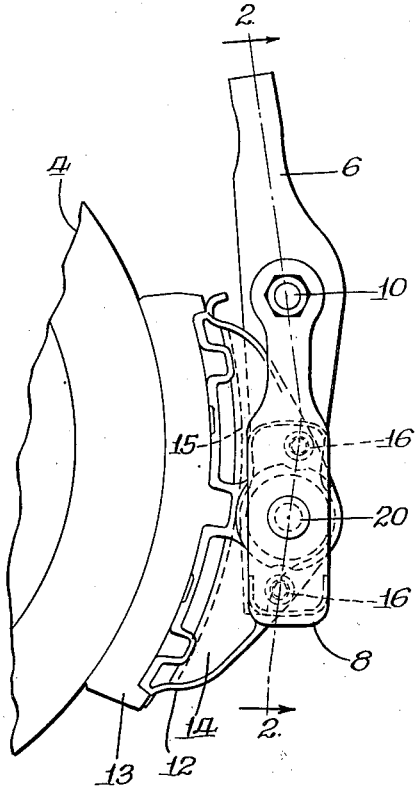
Fig. 1.
Fig. 2.
INVENTOR.
Carl E. Tack Oct. 30, 1956   C. E. TACK   2,768,713
BRAKE HEAD BALANCING DEVICE
Filed Aug. 14, 1951   2 Sheets-Sheet 2

INVENTOR.
Carl E. Tack

United States Patent Office 2,768,713
Patented Oct. 30, 1956

2,768,713

BRAKE HEAD BALANCING DEVICE

Carl E. Tack, Chicago, Ill., assignor to American Steel Foundries, Chicago, Ill., a corporation of New Jersey Application August 14, 1951, Serial No. 241,829

15 Claims. (Cl. 188—205)

My invention pertains to the beamless type of brake rigging for railway cars and is particularly concerned with a novel mechanism for applying a braking force to the car wheel and automatically maintaining a brake head in desired positions relative to the wheel; such mechanism is commonly known as a brake head balancing device.

An object of my invention contemplates the provision of novel and efficient friction means capable of automatically maintaining the brake head in an upright, spaced relation relative to the wheel while the brake is disengaged to prevent the shoe from dragging or binding on the wheel.

Another object of my invention contemplates the provision of an automatically rotatable brake head about its pivotal support so that the shoe will complementally engage the wheel tread upon actuation, within the prictical limits of the varying relations between the shoe and wheel, as the wearing away of metal at the braking surfaces and the continually changing distance between the axis of the sprung brake head and the axis of the unsprung wheel.

A further object of my invention contemplates the provision of a hanger lever and a balance hanger pivotally secured on a common axis so that the friction developing surfaces are not constantly worked during application and release of the brake, but are only worked to accommodate head adjustments.

A yet further object of my invention contemplates the provision of frictional moments, automatically developed, to oppose the rotation of the brake head about its pivotal support.

A still further object of my invention contemplates a design such that spring forces are not imposed on the hanger lever which would shift it as wear takes place between friction parts.

A different object of my invention contemplates the provision of novel means capable of automatically producing a nonbinding disengagement of the brake shoe and wheel tread when the braking force is released.

My invention embodies other novel features, details of construction and arrangement of parts, which are hereafter set forth in the specification and claims and illustrated in the accompanying drawings, wherein:

Figure 1 is a side elevational view of my invention.

Figure 2 is an enlarged sectional view on the line 2—2 of Figure 1.

Figure 3:
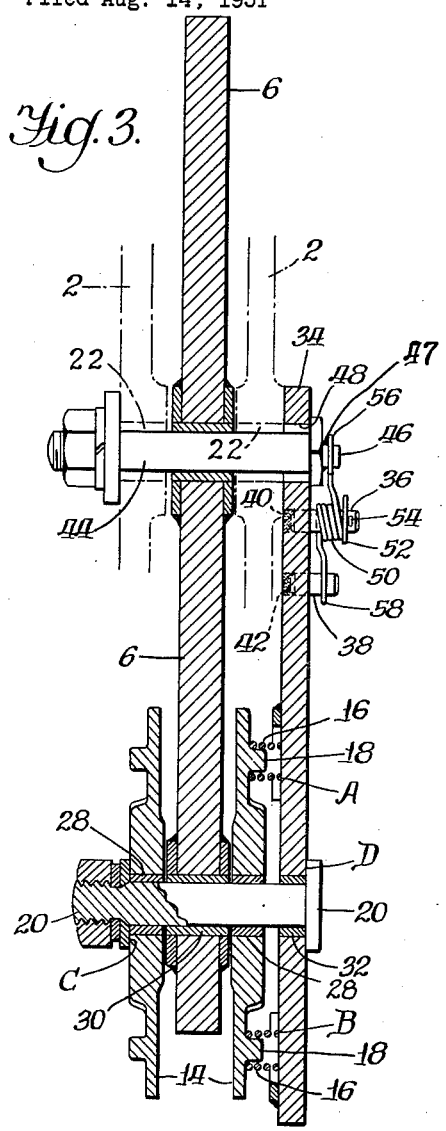
Figure 3 is a sectional view, similar to the view of Figure 2, of a modified form of my invention.

Describing my invention in detail and with reference to the drawings illustrating the mechanism in the engaged position, numeral 2 indicates a hanger lever bracket secured to a railway car truck (not shown) in which an axle (not shown) carrying a wheel 4 is journaled. Hanger lever 6 and balance hanger 8 may be pivotally supported by a pin or bolt and nut assembly 10 secured to bracket 2; brake head 12 is provided with an opening defined by spaced walls 14, 14 and front wall 15 for the reception of hanger lever 6 and for the positive limitation of rotation of brake head 12 relative to hanger lever 6. Brake shoe 13 is secured to brake head 12 for movement therewith. Helical springs 16, 16, sleeved around lugs 18, 18, are interposed between wall 14 and balance hanger 8, the springs being seated in flat face abutment. Hanger lever 6, balance hanger 8, brake head 12, and springs 16, 16, are secured in assembled relation by a bolt and nut assembly 20. This arrangement affords spaced supporting bearings for the bolt or bolt and nut assembly 20, retains springs 16, 16 in a compressed or loaded condition, and affords pivotal movement of brake head 12 relative its axis against the frictional resistance developed at A, B, C and D, as hereinafter more fully described. Bushings affording better wearing surfaces are provided in every pivotal connection as at 22, 22, 24, 26, 28, 28, 30 and 32.

My novel brake head balancing device functions as follows:

The forces exerted by compressed springs 16, 16 cause the members to firmly frictionally engage each other at A, B, C and D to maintain brake head 12 in a substantially upright position while the brake is disengaged; as result of any turning moment exerted on the brake head the flat ends of springs 16, 16 will tend to slide on balance hanger 8 at A and B, the brake head will tend to slide on the washer at C, and the bolt head will tend to slide on the balance hanger at D. This sliding is resisted or checked by the frictional moments automatically developed at A, B, C and D. Consequently, the brake head will normally not rotate under the influence of its weight, vibrations and impacts but will remain in an upright position to readily facilitate braking. The forces exerted by compressed springs 16, 16 on the brake balancing device act to prevent rattling and damaging vibrations.

It is to be noted that during application and release of the brake, the hanger lever 6 and balance hanger 8 rotate in unison on a common axis about the bolt and nut assembly 10, so that relative rotational movement between the lever and hanger is prevented, thereby avoiding consequent working of the springs 16, 16 and excessive wear of the friction parts along surfaces A, B, C, and D.

Furthermore, forces of the springs 16, 16 in the novel arrangement are not imposed on the hanger lever 6 inasmuch as such spring forces therein would shift the lever 6 as wear takes place at A, B, C and D.

Figure 4:
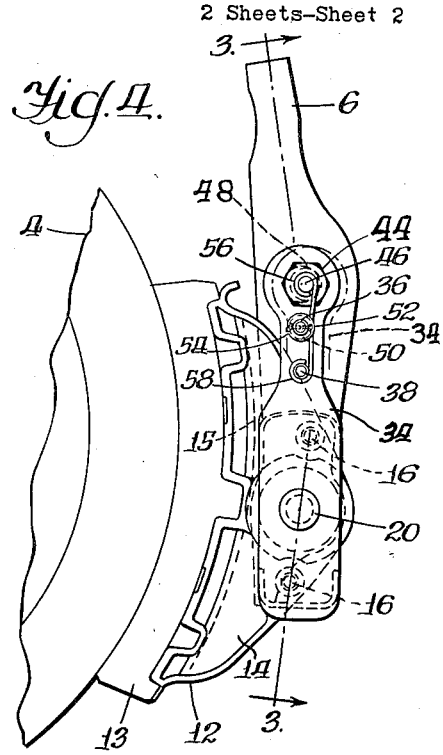
Figure 4 is a side elevational view taken from the right as seen in Figure 3.

The modified form of my invention shown in Figures 3 and 4 comprises a spring actuated brake shoe "kickback" device integrated with the previously described brake head balancing device, and parts corresponding to those of the previous embodiment are identified by corresponding numerals. Numeral 34 indicates a modified balance hanger, supported by the pin 20, having lugs 36 and 38 secured therein as by welds 40 and 42, respectively. A fulcruming and supporting pin 44 having a lug 46 welded thereon, as at 47, passes through an oversized aperture 48 provided in balance hanger 34. Helical torsion spring 50 is sleeved around lug 36 and retained thereon by an abutting washer 52, which is constrained by cotter pin 54. Spring ends 56 and 58 are sleeved over lugs 46 and 36, respectively.

This modified brake head balancing device functions as follows. Upon application of a braking force, the lower edge of brake shoe 13 engages the tread of wheel 4. Thereupon, brake head 12 carrying shoe 13 pivots in a counter-clockwise direction (Figure 4) about the axis of pin 20 until shoe 13 complementally engages the wheel. In addition to this motion, shoe 13 also pivots clockwise about the axis of the hanger lever fulcruming pin 44 as the lever 6 urges the carried brake shoe into engagement with the wheel. As shoe 13 pivots about the axis of pin 20, balance hanger 34 pivots in unison therewith about the axis of pin 20 to deflect the spring end 56, thus storing energy in spring 50. Upon release of the braking force—the before mentioned motion now reversing—this energy is released causing the brake shoe 13 and balance hanger 34 to pivot in a clockwise direction about the axis of pin 20 as hanger lever 6 pivots in a counter-clockwise direction about pin 44 to effect the desired nonbinding disengagement of shoe 13 with the tread of wheel 4. Motion of the balance hanger 34 relative to brake shoe 13 is normally restrained by the frictional forces at A, B, C and D to ensure the proper initiatory positions of shoe 13 and balance hanger 34 (if desired a mechanical interlock may be provided between balance hanger 34 and hanger lever 6 to effect these initiatory positions). The phantom contour lines (Figure 4) indicate the position of balance hanger 34 when the brake is released, and the solid contour lines of balance hanger 34 indicate the position thereof when the brake is engaged.

Figure 5:
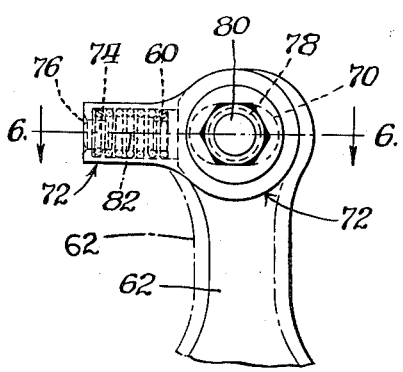
Figure 5 is a fragmentary side elevational view similar to Figure 4 of a further modified form of my invention.
Figure 6:
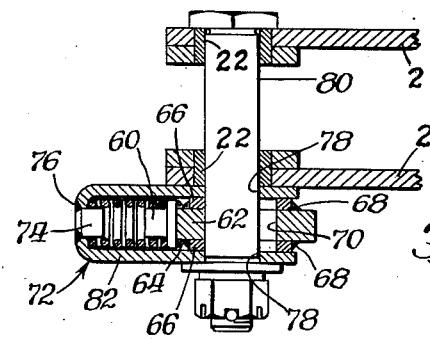
Figure 6 is a sectional view taken on the line 6—6 of Figure 5.

The further modified form of my invention shown in Figures 5 and 6, differs in construction from the previous modification only in the structure shown, which is hereinafter described. Numeral 60 indicates a spring seat secured to balance hanger 62, as by a weld 64. Bosses 66, 66 are welded on the opposing faces of balance hanger 62, as at 68, 68. An oversized aperture 70 is provided in balance hanger 62 to permit spring deflection, as hereinbefore described. Balance hanger 62 is encompassed by a U-shaped clip 72 having a spring guide 74 secured thereto, as by a weld 76, and bearing apertures 78, 78 for the reception of a fulcruming pin 80. A helical coil spring 82 is housed within clip 72 and seated against seat 60 and clip 72. This embodiment is similar in operation to the previously described embodiment: energy is stored in spring 82 upon engagement of the brake shoe with the wheel tread, as hereinbefore described, and released upon release of the braking force to effect the desired nonbinding disengagement of the shoe and wheel tread. The phantom contour lines (Figure 5) indicate the position of balance hanger 62 when the brake is applied, and the solid contour lines of balance hanger 62 indicate the position thereof when the brake is released.

I claim:

1. A brake head balancing device for a railway car truck comprising a supporting pin connected to said truck, a hanger lever pivotally connected to said pin, a balance hanger and a brake head commonly pivotally supported by said lever, a coil spring interposed between said brake head and balance hanger, said balance hanger having an enlarged aperture unconstrainedly encompassing said supporting pin, and a helical torsion spring connected between said supporting pin and balance hanger.

2. A brake head balancing device for a railway car truck comprising a supporting pin connected to said truck, a hanger lever pivotally connected to said pin, a balance hanger and a brake head commonly pivotally supported by said hanger lever, resilient means interposed between said brake head and balance hanger, said balance hanger having an aperture unconstrainedly encompassing said supporting pin, and resilient means connected to and reacting between said supporting pin and balance hanger.

3. A brake head balancing device for a railway car truck comprising a supporting pin connected to said truck, a hanger lever pivotally connected to said pin, a balance hanger and a brake head commonly pivotally supported by said hanger lever, resilient means interposed between said brake head and balance hanger, said balance hanger having an aperture unconstrainedly encompassing said supporting pin, and resilient means seated against said balance hanger and reacting against said supporting pin and balance hanger.

4. A brake head balancing device for a railway car truck comprising a supporting pin connected to said truck, a hanger lever pivotally connected to said pin, a brake head pivotally supported by said hanger lever, a balance hanger connected to said brake head for pivoting movement therewith, said balance hanger having an aperture unconstrainedly encompassing said supporting pin, and a spring having ends connected to said supporting pin and balance hanger.

5. A brake head balancing device for a railway car truck comprising a supporting pin connected to said truck, a hanger lever pivotally connected to said pin, a balance hanger and a brake head commonly pivotally supported by said hanger lever, said balance hanger having an aperture unconstrainedly encompassing said supporting pin, a coil spring interposed between and reacting against said brake head and balance hanger, and a helical torsion spring connected between the balance hanger and the supporting pin.

6. A brake head balancing device for a railway car truck comprising a supporting pin connected to said truck, a hanger lever and a balance hanger pivotally connected to said pin, another pin, a brake head pivotally connected to said hanger lever and balance hanger by said other pin, said balance hanger having an aperture unconstrainedly encompassing said supporting pin, a coil spring reacting against said brake head and balance hanger, and spring means connected between said balance hanger and supporting pin.

7. A brake head balancing device for a railway car truck comprising a supporting pin connected to said truck, a hanger lever pivotally connected to said pin, a balance hanger and a brake head commonly pivotally supported by said hanger lever, said balance hanger having an aperture unconstrainedly encompassing said supporting pin, a coil spring reacting against said brake head and balance hanger, a U-shaped clip disposed about said balance hanger and pivotally connected to said supporting pin, and a coil spring housed within said clip and reacting against said clip and balance hanger.

8. A brake head balancing device for a railway car truck comprising a supporting pin connected to said truck, a hanger lever pivotally connected to said pin, a brake head pivotally supported by said hanger lever, a balance hanger connected to said brake head for pivoting movement therewith, said balance hanger having an aperture unconstrainedly encompassing said supporting pin, a U-shaped clip disposed about said balance hanger and pivotally connected to said supporting pin, and resilient means reacting against said clip and balance hanger.

9. A brake head balancing device for a railway car truck comprising a supporting pin connected to said truck, a hanger lever and a balance hanger pivotally connected to said pin, another pin, a brake head pivotally connected to said hanger lever and balance hanger by said other pin, said balance hanger having an aperture unconstrainedly encompassing said supporting pin, resilient means reacting against said brake head and balance hanger, a U-shaped clip disposed about said balance hanger and sleeved onto said supporting pin, and resilient means housed within said clip and reacting against said clip and balance hanger.

10. A brake head balancing device for a railway car truck comprising a supporting pin connected to said truck, a hanger lever and a balance hanger pivotally connected to said pin, another pin, a brake head pivotally connected by said other pin to said hanger lever, said balance hanger having an aperture unconstrainedly encompassing said supporting pin, a coil spring reacting against said brake head and balance hanger, a housing member pivotally connected to said supporting pin, and resilient means disposed between and reacting against said member and balance hanger.

11. A brake head balancing device for a railway car truck including a hanger lever member and a balance hanger member pivotally connected to the truck by a common pivot, a brake head pivotally connected to the members by another common pivot and operative to engage a friction surface on said truck to decelerate same, spring means compressed between one of said members and the brake head, whereby said head is maintained in a position to facilitate engagement between the head and the friction surface, and spring means connected between and reacting against the truck and one of the members to move said one member relative to the other of said members as the brake head is disengaged from the friction surface, whereby said head is prevented from dragging on said surface during disengagement.

12. A brake head balancing device according to claim 11, wherein said second mentioned spring means consists of a helical torsion spring reacting against both the truck and the balance hanger member.

13. A brake head balancing device according to claim 11, wherein said second mentioned spring means consists of a coiled spring reacting against both the truck and said balance hanger member.

14. In a brake arrangement for a railway car truck having a wheel and axle assembly and a friction surface rotatable therewith; the combination of a lever member and a hanger member pivoted to the frame, a brake head assembly engageable with said surface and pivotally connected to one of said members, and spring means connected between and reacting against the truck and the other member to rotate said head assembly relative to said one member as the head assembly disengages said surface.

15. In a brake arrangement for a railway car truck having a wheel and axle assembly and a friction surface rotatable therewith; the combination of a hanger lever having a pivot connecting same to the truck, a balance hanger connected to the hanger lever and the truck by said pivot, a brake head assembly movable into and out of engagement with the surface, a pin pivotally interconnecting the hanger lever, the balance hanger and the brake head assembly, resilient means interposed between the brake head assembly and the balance hanger, and spring means connected to the pivot and balance hanger to resiliently resist relative rotation between the balance hanger and the hanger lever.

References Cited in the file of this patent

UNITED STATES PATENTS

| | | |
|---|---|---|
| 1,199,872 | Burton | Oct. 3, 1916 |
| 1,269,256 | Burton | June 11, 1918 |
| 1,269,257 | Burton | June 11, 1918 |
| 1,456,632 | Elliot | May 29, 1923 |
| 1,639,256 | Christiansen et al. | Aug. 16, 1927 |
| 2,272,647 | Simanek | Feb. 10, 1942 |
| 2,507,062 | Tack | May 9, 1950 |

FOREIGN PATENTS

| | | |
|---|---|---|
| 11,555 | Great Britain | Apr. 7, 1900 |